(12) United States Patent
Bengtsson

(10) Patent No.: US 11,664,865 B2
(45) Date of Patent: May 30, 2023

(54) OPERATING A TERMINAL DEVICE AND A BASE STATION IN A WIRELESS MIMO SYSTEM

(71) Applicant: Sony Corporation, Tokyo (JP)

(72) Inventor: Erik Bengtsson, Eslov (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/622,733

(22) PCT Filed: Jun. 14, 2017

(86) PCT No.: PCT/EP2017/064620
§ 371 (c)(1),
(2) Date: Dec. 13, 2019

(87) PCT Pub. No.: WO2018/228687
PCT Pub. Date: Dec. 20, 2018

(65) Prior Publication Data
US 2020/0212977 A1    Jul. 2, 2020

(51) Int. Cl.
*H04B 7/06* (2006.01)
*H04B 7/0452* (2017.01)
*H04L 5/00* (2006.01)

(52) U.S. Cl.
CPC ......... *H04B 7/0617* (2013.01); *H04B 7/0452* (2013.01); *H04B 7/0639* (2013.01);
(Continued)

(58) Field of Classification Search
CPC ... H04L 5/0048; H04L 5/0023; H04L 5/0051; H04B 7/0456; H04B 7/0617; H04B 7/0452; H04B 7/0695
See application file for complete search history.

(56) References Cited

U.S. PATENT DOCUMENTS

2008/0225960 A1\* 9/2008 Kotecha ............... H04B 7/0413
375/259
2009/0168714 A1\* 7/2009 Tanaka ................. H04L 1/1671
370/329
(Continued)

FOREIGN PATENT DOCUMENTS

CN        101409921 A      4/2009
CN        101472338 A      7/2009
(Continued)

OTHER PUBLICATIONS

Erik L.Bengtsson, Massive MIMO From a Terminal Perspective, Department of Electrical and Information Technology, Lund University, 2019 (Year: 2019).\*
(Continued)

*Primary Examiner* — Aristocratis Fotakis
(74) *Attorney, Agent, or Firm* — Tucker Ellis LLP

(57) ABSTRACT

The present application relates to a method for operating a device (30) of a wireless multiple-input and multiple-output (MIMO) system (10) providing wireless communication. An interfering signal interfering the wireless communication is detected (107) and a transmit beamforming parameter is determined (108) based on the detected interfering signal. A beamformed pilot signal using the transmit beamforming parameter is transmitted (111).

16 Claims, 4 Drawing Sheets

(52) U.S. Cl.
CPC ......... *H04B 7/0695* (2013.01); *H04L 5/0023* (2013.01); *H04L 5/0048* (2013.01)

(56) References Cited

U.S. PATENT DOCUMENTS

| | | |
|---|---|---|
| 2010/0150013 A1* | 6/2010 | Hara ................ H04B 17/12 370/252 |
| 2010/0309854 A1 | 12/2010 | Wu et al. |
| 2015/0215016 A1 | 7/2015 | Hunukumbure |
| 2016/0112162 A1 | 4/2016 | Tabet |
| 2016/0249245 A1 | 8/2016 | Kim et al. |
| 2016/0270087 A1* | 9/2016 | Soriaga ............. H04B 7/0626 |
| 2016/0330732 A1 | 11/2016 | Moon |
| 2018/0062810 A1* | 3/2018 | Vitthaladevuni ... H04W 52/146 |
| 2018/0091197 A1* | 3/2018 | Huang ............... H04L 25/0224 |
| 2018/0097595 A1* | 4/2018 | Huang ............... H04L 1/0009 |
| 2018/0124724 A1* | 5/2018 | Tsai ................ H04W 74/0833 |
| 2018/0294863 A1* | 10/2018 | Nilsson ............. H04B 7/0408 |
| 2019/0028305 A1* | 1/2019 | Zhang ............... H04B 7/0634 |
| 2019/0068261 A1* | 2/2019 | Priyanto ............ H04L 1/1819 |
| 2019/0173607 A1* | 6/2019 | Liu ................ H04L 5/0044 |
| 2019/0190569 A1* | 6/2019 | Nayeb Nazar ....... H04B 7/0417 |

FOREIGN PATENT DOCUMENTS

| | | |
|---|---|---|
| CN | 104509189 A | 4/2015 |
| CN | 104521309 A | 4/2015 |

OTHER PUBLICATIONS

R1-1706938, UL SRS design for beam management CSI acquisition, 3GPP TSG RAN WG1 Meeting #89, Huawei, HiSilicon, China, May 15-19, 2017 (Year: 2017).*

International Search Report and Written Opinion for International Application No. PCT/EP2017/064620, dated Jan. 26, 2018, 14 pages.

Office Action from corresponding Chinese Application No. 201780091895.6, dated Jun. 2, 2021, 13 pages.

* cited by examiner

OPERATING A TERMINAL DEVICE AND A BASE STATION IN A WIRELESS MIMO SYSTEM

FIELD OF THE INVENTION

The present invention relates to methods for operating a device in a wireless multiple-input and multiple-output (MIMO) system providing a wireless communication. In particular, the present invention relates to a method for operating a terminal device and a corresponding cooperating method for operating a base station for determining transmit and receive beamforming parameters to be used for a communication between these devices. The present invention relates furthermore to devices implementing the methods.

BACKGROUND OF THE INVENTION

For meeting the increasing demands in data and voice communication in daily life including personal communication via mobile telephones, smart phones and machine type communication (MTC), for example communication of Internet of things (IOT), the so-called multiple-input and multiple-output (MIMO) technology may be used in wireless communication systems, for example wireless cellular telecommunication systems.

In MIMO systems multiple send and receive antennas may be utilised at a base station as well as at terminal devices for wireless communication. The MIMO technology utilises coding techniques, which use the temporal and the spatial dimension for transmitting information. This enhanced coding of MIMO systems allows to increase the spectral and energy efficiency of the wireless communication.

According to MIMO technologies, the base station may include a large number of antennas that are operated fully coherently and adaptively. The base station may include for example several tens or even in excess of one hundred antennas with associated transceiver circuitry. Systems using a very large number of antennas, for example hundreds or thousands of antennas, are also referred to as massive MIMO systems. The extra antennas of a massive MIMO base station allow radio energy to be spatially focused in transmissions as well as a directional sensitive reception, which improve spectral efficiency and radiated energy efficiency. Massive MIMO may be advantageous compared to beamforming (BF) as beamforming relies on phasing the antenna elements in order to obtain the beam in a certain direction. Consequently, any signal contribution outside this beam will be attenuated. In a massive MIMO system, not only all or multiple beams or signals from different radiation paths are used, but they are additionally coherently combined such that a higher gain may be achieved, the so-called (massive) MIMO gain.

In the same way as the base station, the terminal devices may each include a plurality of antennas to allow radio energy to be spatially focused in transmissions as well as a directional sensitive reception, which improves spectral efficiency and radiated energy efficiency.

In order to adapt transmit and receive signals at each individual antenna of the base station in accordance with the currently active terminal device, a base station logic needs information about wireless radio channel properties between the terminal device and the antennas of the base station. A pilot signalling scheme, a so-called channel sounding, is used for this purpose, which allows the base station to set antenna configuration parameters for transmitting signals, so as to focus radio energy at the terminal device and/or for receiving radio signals from the terminal device. Thus, focus may mean both phase align contribution with different path lengths and transmit mainly in directions that will reach the terminal device. Training sequences, so-called pilot signals, may be transmitted from the terminal device in a resource that is dedicated to the terminal device. Pilot signals from different terminal devices need to be orthogonal in order for the base station to identify the configuration parameters for the plurality of antennas for each one of the terminal devices. Orthogonality may be achieved by using time division multiple access (TDMA), code division multiple access (CDMA) or frequency division multiple access (FDMA) technologies or a combination thereof.

In case the MIMO system uses time division multiple access (TDMA) or frequency division multiple access (FDMA), each terminal device can transmit a pilot signal in a specifically allocated resource (defined for example by its time slot and frequency range within a frame, i.e. a time-frequency radio resource). For example, systems according to LTE (Long Term Evolution) technologies and standards, support both frequency division duplex (FDD) and time division duplex (TDD) modes. While FDD makes use of paired spectra for uplink (UL) and downlink (DL) transmission separated by a duplex frequency gap, TDD splits one frequency carrier into alternating time periods for transmission from the base station to the terminal device and vice versa. Both modes have their own frame structures within LTE and these are aligned with each other meaning that similar hardware can be used in the base stations and terminal devices to allow for economy of scale. The LTE transmission is structured in the time domain in radio frames. Each of these radio frames is 10 ms long and consists of 10 sub-frames of 1 ms each. The Orthogonal Frequency Division Multiple Access (OFDMA) sub-carrier spacing in the frequency domain is 15 kHz. Twelve of these sub-carriers together allocated during a 0.5 ms timeslot are called a resource block. Each resource block may contain a plurality of resource elements. An LTE terminal device can be allocated, in the downlink or uplink, a minimum of two resource blocks during one sub-frame (1 ms). A resource block, defined by its time slot and set of sub-carriers, is the smallest unit of resources that can be allocated to a terminal device or user. Such a resource block may be called time-frequency radio resource. Data transmitted via resource blocks in a plurality of consecutive frames is also called "stream". Orthogonality for pilot signals may be achieved by allocating different resources.

The pilot signal can be received by the antennas of the base station and analyzed by the base station logic for channel sounding the uplink radio channel. Vice versa, the base station may transmit a pilot signal in an allocated resource to a terminal device for channel sounding the downlink radio channel. The timeslots and frequency ranges, in which terminal devices may transmit their pilot signals in combination, are also referred to as pilot portion of a transmission frame. The remaining timeslots and frequency ranges of the frame may be used for downlink (DL) and uplink (UL) data and control transmission. The pilot signals may each include a training sequence, and the pilot signals received at the plurality of antennas of the base station are analyzed by the base station logic. Information about a radio channel property of the radio channel between the terminal device and the plurality of antennas of the base station may be obtained as a result of this analysis. A base station may use the results of the analysis to determine configuration parameters for transmitting signals via the antennas to the respective terminal devices and for receiving signals via the antennas from the respective terminal devices. For example, based on the received uplink pilot signal, receive configuration parameters may be obtained and transmit configuration parameters may be obtained based on reciprocity.

As the wireless radio channel property of the wireless channel between the terminal device and the base station may vary with time, the pilot signalling has to be repeated after at least a so-called coherence time, which indicates the time duration over which the channel property is considered to be not varying. Likewise, as the transmission of payload data may use large frequency ranges, for each coherence bandwidth of a payload data transmission a corresponding pilot signal may be provided for analyzing the channel properties within the coherence bandwidth. The coherence bandwidth is a statistical measurement of a range of frequencies over which the channel is considered to be "flat", or in other words the approximate maximum bandwidth over which two frequencies of a signal are likely to experience comparable or correlated amplitude fading.

To sum up, (massive) MIMO may be advantageous in terms of spectral efficiency. It enables multiple users to simultaneously use the same time and frequency resources. However, performance may be limited by a coherence block size (this is the combination of coherence time and coherence bandwidth) as each coherence block needs a pilot signal for each stream. The pilot signals are scarce resources as they need to be orthogonal in time and/or frequency and/or coding (CDMA) domain and hence become overhead that may limit the spectral efficiency, i.e. non spatially orthogonal.

For saving resources required for the transmission of pilot signals, the terminal device may transmit pilot signals using the plurality of antennas and the above described transmit configuration parameters within the coherence block size such that a same resource may be used by a plurality of terminal devices. Thus, the base station can distinguish the pilot signals received from different terminal devices and may adapt its receive configuration parameters for each terminal device based on the received pilot signals. Based on the receive configuration parameters, the base station may obtain or adapt corresponding transmit configuration parameters based on reciprocity. Furthermore, instead of transmitting a pilot signal from the base station to the terminal device, the base station may transmit payload data using the plurality of antennas and the above described transmit configuration parameters and the receiving terminal device may adapt its receive configuration parameters by optimising gain and signal-to-noise ratio. Based on the thus determined receive configuration parameters, the terminal device may obtain or adapt its corresponding transmit configuration parameters based on reciprocity.

However, a condition that may violate the reciprocity assumption is, when there is interference present in the radio channel, which may interfere essentially only one direction, for example only the receive direction at the terminal device.

SUMMARY OF THE INVENTION

In view of the above, there is a need in the art for enhancing multiple-input and multiple-output, MIMO, systems, in particular massive MIMO systems, in case of the above-described channel interference.

According to the present invention, this object is achieved by the features of the independent claims. The dependent claims define embodiments of the invention.

In the following description, the term "time-frequency radio resource" will be used. With regard to LTE technologies, a time-frequency radio resource may relate to at least one resource block and is therefore characterised by time slot(s) and the frequency range(s) of its subcarriers. In particular, with regard to LTE technologies and according to the present invention, a time-frequency radio resource may relate to a plurality of resource blocks within a predetermined coherence bandwidth and/or coherence time. For example, the plurality of resource blocks may comprise the resource blocks within a frame or some subsequent frames and within a predetermined frequency range (for example within a coherence bandwidth within the range of 1 to 5 MHz).

Furthermore, in the following description the terms "transmit beamforming parameter" and "receive beamforming parameter" will be used. The transmit beamforming parameter may comprise a definition of a phase and gain or amplitude for each antenna element of the plurality of antenna elements of a communication device, for example a terminal device or a base station. The phase and gain or amplitude is used when transmitting radio signal, for example a radio payload signal or a radio pilot signal, via the corresponding antenna element. Consequently, the radio signal transmitted using the phase and gain or amplitude will be designated as "beamformed signal". In the art, such a beamformed signal is sometimes also designated as precoded signal. The receive beamforming parameter may comprise a definition of a phase and gain or weighting for each antenna element of the plurality of antenna elements of a communication device, for example a terminal device or a base station. The phase and gain or weighting is used when receiving a radio signal, for example a radio payload signal or a radio pilot signal, via the corresponding antenna element.

According to the present invention, a method for operating a device of a wireless multiple-input and multiple-output (MIMO) system is provided. The device may comprise for example a terminal device like a mobile telephone, in particular a so-called smart phone, a tablet PC or an Internet of Things (IoT) device. However, the method is not restricted to terminal devices, but may also be used in connection with a base station or a relay or access device of the MIMO system. The wireless MIMO system may comprise for example a cellular Long Term Evolution (LTE) system or 5G New Radio (NR) as defined by 3GPP.

According to the method, an interfering signal, which interferes the wireless communication, is detected. The interfering signal may come from an interferer, for example another terminal device, access point, relay station or base station operated in the MIMO system or operated in another wireless communication system, or the interfering signal may come from any other interferer emitting a radio signal in at least parts of the frequency range used for the wireless communication in the MIMO system. Based on the detected interfering signal, a transmit beamforming parameter is determined.

For example, the device may determine properties of the interfering signal and may compute a receive beamforming parameter which nulls the interfering signal. The transmit beamforming parameter may be determined based on reciprocity of the receive beamforming parameter. For example, the device may try different phase/amplitude combinations in an iterative manner until a receive beamforming parameter with a null in the direction of the interferer is found. In another example, with the assumption that the device can identify for example frames from the interfering signal, the device may use sounding signals (pilots) from the interferer to instantly derive the receive beamforming parameter based on for example the dominant eigenmode. Finally, the device transmits a beamformed pilot signal using the transmit beamforming parameter.

For example, the device may comprise a terminal device. The terminal device may transmit, to a base station, a beamformed pilot signal using the transmit beamforming parameter determined based on a detected interfering signal from the interferer. In response to the beamformed pilot signal, the base station may determine a corresponding transmit beamforming parameter which is used by the base station for transmitting beamformed radio signals, for example payload data radio signals, to the terminal device. The terminal device may receive the beamformed radio signals using a receive beamforming parameter which also considers the detected interfering signal. Thus, a downlink communication from the base station to the terminal device is optimised to exclude or at least significantly nullify (attenuate) the interfering signal.

According to an embodiment, a time-frequency radio resource for transmitting the beamformed pilot signal which considers the interfering signal may be allocated by negotiation between the terminal device and the base station.

According to an embodiment, a time-frequency radio resource allocation request requesting an allocation of a time-frequency radio resource for transmitting the beamformed pilot signal is transmitted, for example from the terminal device to the base station. In response to the time-frequency radio resource allocation request, a confirmation is received. For example, the confirmation is transmitted from the base station to the terminal device. The confirmation comprises a time-frequency radio resource for transmitting the beamformed pilot signal. This time-frequency radio resource may be selected from the base station. The beamformed pilot signal is transmitted on the time-frequency radio resource.

According to another embodiment, a time-frequency radio resource for transmitting the beamformed pilot signal is determined, for example by the terminal device by selecting a resource from a predefined set of time-frequency radio resources. The predefined set of time-frequency radio resources may be predefined for the communication system or may be defined by the base station and distributed to the terminal devices. A notification indicating the determined time-frequency radio resource is transmitted, for example from the terminal device to the base station. A confirmation is received (e.g. from the base station) in response to the notification. The confirmation indicates an acknowledgement to use the time-frequency radio resource proposed by the terminal device for transmitting the beamformed pilot signal. The beamformed pilot signal is transmitted on the time-frequency radio resource.

The above described time-frequency radio resource for transmitting the beamformed pilot signal may comprise resources which are additionally allocated for the pilot signal which considers the interfering signal, and may be a different resource than a resource which is predefined in the MIMO system for channel sounding pilot transmission.

A same resource may be shared by a plurality of terminal devices for the transmission of beamformed pilot signals from the terminal devices to the base station. For example, the same resource may be shared in a random access manner or by using a listen before talk (LBT) or similar technique.

However, the base station needs to know who transmitted the pilots and this may be communicated or negotiated between the terminal devices and the base station. Thus, the beamformed pilot signals may be transmitted from the plurality of terminal devices without affecting each other. This may enable the base station to adjust its receive beamforming parameters and transmit beamforming parameters to the corresponding terminal devices without significantly increasing the amount of required transmission capacity for pilot signal transmission.

The transmission of the beamformed (uplink) pilot signals from the terminal devices and the adjustment of receive and transmit beamforming parameters at the base station based thereon may be performed on a regular base. Intervals for adjusting the receive and transmit beamforming parameters of the base station may be short, for example in a range of 0.5 to 10 ms, in particular for example 1 ms. Thus, coherency and a corresponding MIMO gain may be maintained for each communication channel between the base station and the corresponding terminal device.

According to an embodiment, a beamformed signal from a further device of the wireless MIMO system is detected, and a further transmit beamforming parameter is determined based on the detected beamformed signal from the further device. The further transmit beamforming parameter is at least partially different from the transmit beamforming parameter.

Based on the detected beamformed signal from the further device, a receive beamforming parameter may be determined.

Additionally, a further beamformed pilot signal may be transmitted using the further transmit beamforming parameter.

Following the example above, the device may comprise a terminal device and the further device may comprise a base station of the wireless MIMO system. According to this example, the further transmit beamforming parameter is determined by the terminal device based on a beamformed signal received from the base station. The beamformed signal from the base station may comprise a dedicated to beamformed pilot signal from the base station or a beamformed payload or control signal from the base station. Based on the beamformed signal received from the base station, the terminal device may determine a receive beamforming parameter, for example by optimising gain and signal-to-noise. The further transmit beamforming parameter may be determined based on reciprocity of this receive beamforming parameter. It is to be noticed that this receive beamforming parameter and consequently the further transmit beamforming parameter do not consider the interfering signal. Therefore, the further transmit beamforming parameter is optimised to the channel characteristics in the uplink direction from the terminal device to the base station, which is considered to be essentially not influenced by the interfering signal. The further beamformed pilot signal is transmitted from the terminal device to the base station using the further transmit beamforming parameter. Based on the further beamformed pilot signal, the base station may adapt or determine its receive beamforming parameter such that an uplink communication from the terminal device to the base station may be optimised.

To sum up, the terminal device may transmit two differently beamformed pilot signals to the base station, the beamformed pilot signal and the further beamformed pilot signal. The beamformed pilot signal may be used by the base station to optimise a downlink transmission considering the interfering signal, whereas the further beamformed pilot signal may be used by the base station to optimise the uplink transmission, which is essentially not influenced by the interfering signal. Beamformed payload signals using the further transmit beamforming parameter may be transmitted from the terminal device to the base station.

As described above, the time-frequency radio resource for transmitting the beamformed pilot signal which considers the interfering signal may be allocated by negotiation between the terminal device and the base station. In the following embodiment, the first time-frequency radio resource may correspond to this time-frequency radio resource for transmitting the beamformed pilot signal which considers the interfering signal.

According to an embodiment, the beamformed pilot signal is transmitted on a first time-frequency radio resource of the wireless MIMO system, and the further beamformed pilot signal is transmitted on a second time-frequency radio resource of the wireless MIMO system. The first time-frequency radio resource is different from the second time-frequency radio resource. However, the first time-frequency radio resource and the second time-frequency radio resource may be transmitted within a same transmission frame of the wireless MIMO system.

According to another embodiment, the transmit beamforming parameter is determined additionally based on the further transmit beamforming parameter. For example, the further transmit beamforming parameter may be optimised with respect to the radio channel properties between the terminal device and the base station without considering the interfering signal. When considering the interfering signal, based on the further transmit beamforming parameter, the transmit beamforming parameter may be determined to be not sensitive to signals in the direction of the interferer. For example, the transmission pattern resulting from the further transmit beamforming parameter may be tilted such that the direction of the interferer is essentially nullified.

According to another embodiment, from each individual antenna element of a plurality of antennas elements of the device, a corresponding raw pilot signal is transmitted on a dedicated time-frequency resource.

For example, the terminal device may transmit subsequently from each individual antenna element of a plurality of antenna elements of the terminal device a corresponding raw uplink pilot signal. In other words, an uplink pilot signal is sent without beamforming (no beamforming means no precoding, but a "raw" uplink pilot signal only) subsequently from each of the antenna elements of the plurality of antenna elements of the terminal device. For example, the uplink pilot signal is first sent from a first antenna element of the plurality of antenna elements while the remaining antenna elements of the plurality of antenna elements are silent. Subsequently, the uplink pilot signal is sent from a second antenna element of the plurality of antenna elements while the remaining antenna elements of the plurality of antenna elements are silent. This is continued until the uplink pilot signal has been sent from the last antenna element of the plurality of antenna elements while the remaining antenna elements of the plurality of antenna elements were silent. Additionally or as an alternative, the plurality of raw uplink pilot signals may be transmitted in a frequency multiplexed manner from the plurality of antenna elements of the terminal device, for example simultaneously. For example, a first raw uplink pilot signal is transmitted from the first antenna element using a first frequency range, a second raw uplink pilot signal is transmitted from the second antenna element using a second frequency range, and so on. The first, second and further frequency ranges are different from each other.

The base station may estimate channel characteristics of the radio channel between the base station and the terminal device based on receive properties of the raw uplink pilot signals. Based on the channel characteristics, the base station may determine a transmit beamforming parameter (downlink) and a receive beamforming parameter (uplink) to be used by the base station for communicating signals between the base station and the terminal device.

For example, the base station may compute a Hermitian conjugate based on the receive properties of the raw pilot signals received at the plurality of antenna elements of the base station to determine a delay (phase) and an amplitude (gain) for each antenna element of the base station when transmitting downlink signals (beamforming) and/or receiving uplink signals.

As an alternative, the base station may react on each reception of a pilot signal individually, i.e. the base station may not consider the raw pilots in combination, but each raw pilot individually. In this example, the base station may "blindly" perform the same processing for each received pilot signal, but is not aware of what the terminal device does in the perspective of how the pilots are transmitted. In detail, the terminal device may transmit raw pilots from all antennas on different resources and based on associated signals received from the base station, e.g. correspondingly precoded payload or control signals, the terminal device may compute the further transmit beamforming parameter and may transmit pilot signals using the further transmit beamforming parameter. Then, if the terminal device detects an interfering signal, it determines the transmit beamforming parameter and may request a resource for transmitting a pilot signal using the transmit beamforming parameter. Thus, there are two precoded pilot signals both transmitted by the terminal device, one for uplink and one for downlink precoding. The terminal may update both whenever needed by transmitting raw pilots occasionally and analyze the interferer situation.

The described embodiments may be used to set up the transmit beamforming parameter (downlink) and the receive beamforming parameter (uplink) of the base station initially or in regular intervals, e.g. once a second, or whenever the terminal device detects a change in its environment, e.g. whenever an interfering signal is detected.

According to the present invention, a further method for operating a device of a wireless multiple-input and multiple-output (MIMO) system is provided. The wireless MIMO system provides a wireless communication, for example between a base station and a terminal device. According to the method, a beamformed pilot signal is detected. The beamformed pilot signal is transmitted from a further device of the MIMO system using a transmit beamforming parameter. The transmit beamforming parameter is determined based on a detected interfering signal, which interferes the wireless communication.

For example, the device may comprise a base station and the further device may comprise a terminal device of the MIMO system. The terminal device may determine the transmit beamforming parameter based on the detected interfering signal and may transmit the beamformed pilot signal using the transmit beamforming parameter to the base station. The base station may detect the beamformed pilot signal.

According to an embodiment, a time-frequency radio resource for transmitting the beamformed pilot signal which considers the interfering signal may be allocated by negotiation between the terminal device and the base station.

For example, a time-frequency radio resource allocation request is received from the further device. The time-frequency radio resource allocation request requests an allocation of a time-frequency radio resource for transmitting the beamformed pilot signal, which considers the interfering signal. A time-frequency radio resource for transmitting the beamformed pilot signal is determined, for example selected from a predefined set of time-frequency radio resources. A confirmation comprising the determined time-frequency radio resource is transmitted to the further device.

According to another example, a notification indicating a time-frequency radio resource for transmitting the beamformed pilot signal is received from the further device. In response to the notification, a confirmation is transmitted. The confirmation indicates an acknowledgement to use the proposed time-frequency radio resource for transmitting the beamformed pilot signal from the further device.

According to embodiments, based on the detected beamformed pilot signal, the device (for example the base station) may determine a transmit beamforming parameter. Furthermore, the device (for example the base station) may determine a receive beamforming parameter based on a detected further beamformed pilot signal from the further device (for example the terminal device). The further beamformed pilot signal is associated with a different transmit beamforming parameter if compared to the transmit beamforming parameter associated with the beamformed pilot signal.

In other words, the device (for example the base station) may receive or detect two differently beamformed pilot signals, i.e. the beamformed pilot signal and the further beamformed pilot signal. One of the beamformed pilot signals (namely the beamformed pilot signal) is used for determining the transmit beamforming parameter, whereas the other of the beamformed pilot signals (namely the further beamformed pilot signal) is used for determining the receive beamforming parameter. Thus, a different beamforming may be utilized for receiving data from the terminal device and transmitting data to the terminal device. In particular, as the beamformed pilot signal considers an interfering signal, which interferes the wireless communication in the communication direction from the base station to the terminal device, the transmit beamforming parameter may be configured such that a corresponding receive beamforming parameter at the terminal device essentially ignores or nullifies (significantly attenuates) the interfering signal.

According to an embodiment, the beamformed pilot signal from the further device (for example the terminal device) is received on a first time-frequency radio resource, and the further beamformed pilot signal from the further device (for example the terminal device) is received on a second time-frequency radio resource. The first and second time-frequency radio resources are different.

The first and second time-frequency radio resources may be allocated in the same communication frame defined in the MIMO system. Therefore, the beamformed pilot signal and the further beamformed pilot signal may be transmitted from the further device (for example the terminal device) in the same communication frame.

According to a further embodiment, from each individual antenna element of the plurality of antenna elements of the further device, a corresponding raw pilot signal is received on a dedicated time-frequency resource. The transmit beamforming parameter is determined based on the plurality of received raw pilot signals. Furthermore, the receive beamforming parameter is determined based on the plurality of received raw pilot signals. The transmission of the raw pilot signals for determining characteristics of the radio channel is also called channel sounding. Thus, an initial determination of the transmit beamforming parameter and the receive beamforming parameter may be conducted in the device (for example in the base station) for setting up the spatially multiplexed communication with the further device (for example the terminal device).

According to another embodiment, the device (e.g. the base station) may react on each reception of a pilot signal individually, i.e. the device may not consider the plurality of raw pilots in combination, but each raw pilot individually. In other words, the device (e.g. base station) may "blindly" perform the same processing for each received pilot signal, but is not aware of what the further device (e.g. the terminal device) does in the perspective of how the pilots are transmitted.

For example, the terminal device may transmit raw pilots from all antennas on different resources and the base station may process each raw pilot signal individually and may adapt its beamforming transmit parameter accordingly to transmit signals, for example payload or control signals. Based on signals received from the base station, e.g. correspondingly precoded payload or control signals, the terminal device may compute the further transmit beamforming parameter and may transmit pilot signals using the further transmit beamforming parameter. Then, if the terminal device detects an interfering signal, it determines the transmit beamforming parameter and may request or determine a resource for transmitting a pilot signal using the transmit beamforming parameter. Thus, there are two precoded pilot signals both transmitted by the terminal device, one may be used by the base station for configuring the (uplink) receive beamforming parameter and one may be used by the base station for configuring the (downlink) transmit beamforming of the base station. The terminal may update both whenever needed by transmitting raw pilots occasionally and analyzing the interferer situation.

The channel sounding with the raw pilot signals may be performed in regular intervals, for example every second or every few seconds. Additionally or as an alternative, the channel sounding using the raw pilot signals may be triggered based on quality measurements to maintain coherence of the MIMO communication. Determining or adapting transmit and receive beamforming parameters may be performed on a more frequent basis, for example in a range of 0.5 to 10 ms, in particular for example every millisecond. Thus, coherency and a corresponding MIMO gain may be maintained for each communication channel between the base station and the corresponding terminal device.

According to an embodiment, a beamformed signal, for example a beamformed control or data signal, is transmitted using the determined transmit beamforming parameter. Based on the beamforming, different control or data signals may be transmitted to different further devices (for example terminal devices) using the same radio resource and the spatial multiplexing. Likewise, a beamformed signal, for example a beamformed control or data signal, may be transmitted using the determined to receive beamforming parameter. Based on the beamforming, different control or data signals may be received from different further devices (for example terminal devices) using the same radio resource and the spatial multiplexing.

According to a further embodiment, the device (for example the base station) determines, whether the beamformed pilot signal is received or not. For example, the device may distinguish whether only the further beamformed pilot signal or the further beamformed pilot signal as well as the beamformed pilot signal received. In case the beamformed pilot signal is not received, the transmit beamforming parameter is determined based on the further beamformed pilot signal. In case the beamformed pilot signal is received, the transmit beamforming parameter is determined based on the beamformed pilot signal.

Additionally or as an alternative, the terminal device may instruct or request the base station, e.g. by a corresponding control message, to consider the beamformed pilot signal or not.

As described above, the beamformed pilot signal and the further beamformed pilot signal enable the device (for example the base station) to configure different beamformings for the receive and transmit direction, for example to consider an interfering signal which only influences the transmit (downlink) direction. In case an interfering signal is present, the further device (for example the terminal device) transmits the beamformed pilot signal as well as the further beamformed pilot signal. In this case, the device (for example the base station) may use different beamformings for the receive and transmit direction. In case no interfering signal is present, the further device may only transmit the further beamformed pilot signal, and the device (for example the base station) may use the same (reciprocity based) beamforming for the receive and the transmit directions.

Further, according to the present invention, a device of a wireless multiple-input and multiple-output (MIMO) system providing a wireless communication is provided. The device may comprise for example a terminal device. The device comprises a plurality of antenna elements, a so-called antenna array. The device comprises furthermore a logic configured to detect an interfering signal received at the plurality of antenna elements. The interfering signal is such that it interferes the wireless communication of the wireless MIMO system. The logic is furthermore configured to determine a transmit beamforming parameter based on the detected interfering signal, and to transmit a beamformed pilot signal using the transmit beamforming parameter via the plurality of antenna elements.

The device may be configured to perform the above-described method and the embodiments thereof.

Furthermore, according to the present invention, a device of a wireless multiple-input and multiple-output (MIMO) system is provided. The device may comprise for example a base station of the MIMO system. The MIMO system provides a wireless communication, for example between the base station and one or more terminal devices. The device comprises a plurality of antenna elements and logic configured to detect a beamformed pilot signal. The logic may comprise for example a control logic or a processor and a control program. The beamformed pilot signal is transmitted from a further device of the MIMO systems using the transmit beamforming parameter. The further device may comprise for example a terminal device. The transmit beamforming parameter is determined by the further device based on a detected interfering signal interfering the wireless communication.

The device may be configured to perform the above-described method and the embodiments thereof.

The devices of the present invention, for example a base station and/or the terminal device, may be configured to communicate according to the so-called Long Term Evolution (LTE) cellular communication network standard. The terminal device may comprise a mobile telephone, for example a so-called smartphone. Additionally or as an alternative, the devices of the present invention may be configured for a communication in a wireless local area network (WLAN), for example according to IEEE 806.11 standards. Massive MIMO may also be supported by the base station in for example WLAN environments. Additionally or as an alternative, the base station may act as a coordinated access point (AP) in for example an office building or an airport, or in a 3GPP NR.

According to embodiments, the MIMO system may be a massive MIMO system. The devices may include more than ten antenna elements, for example several tens of antenna elements or even in excess of 100 or 1000 antenna elements, to transmit and receive signals. Furthermore, the base station antenna elements may be distributed. The plurality of antenna elements may comprise several subsets located at several locations remote from each other. The several subsets may interact with each other in cooperative MIMO manner.

Although specific features in the above summary and the following detailed description are described in connection with specific embodiments and aspects of the present invention, it should be understood that the features of the exemplary embodiments and aspects may be combined with each other unless specifically noted otherwise. In particular, the assignment of the roles in several examples that the terminal device is the device which detects the interfering signal and transmits two different pilot signals such that the base station may establish a transmit beamforming which is different from a receive beamforming, may be reversed such that the base station detects the interfering signal and transmits two different pilot signals such that the terminal device may establish a transmit beamforming which is different from the received beamforming.

BRIEF DESCRIPTION OF THE DRAWINGS

Embodiments of the invention will be described in more detail with reference to the accompanying drawings.

DETAILED DESCRIPTION OF THE EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise.

Figure 1:
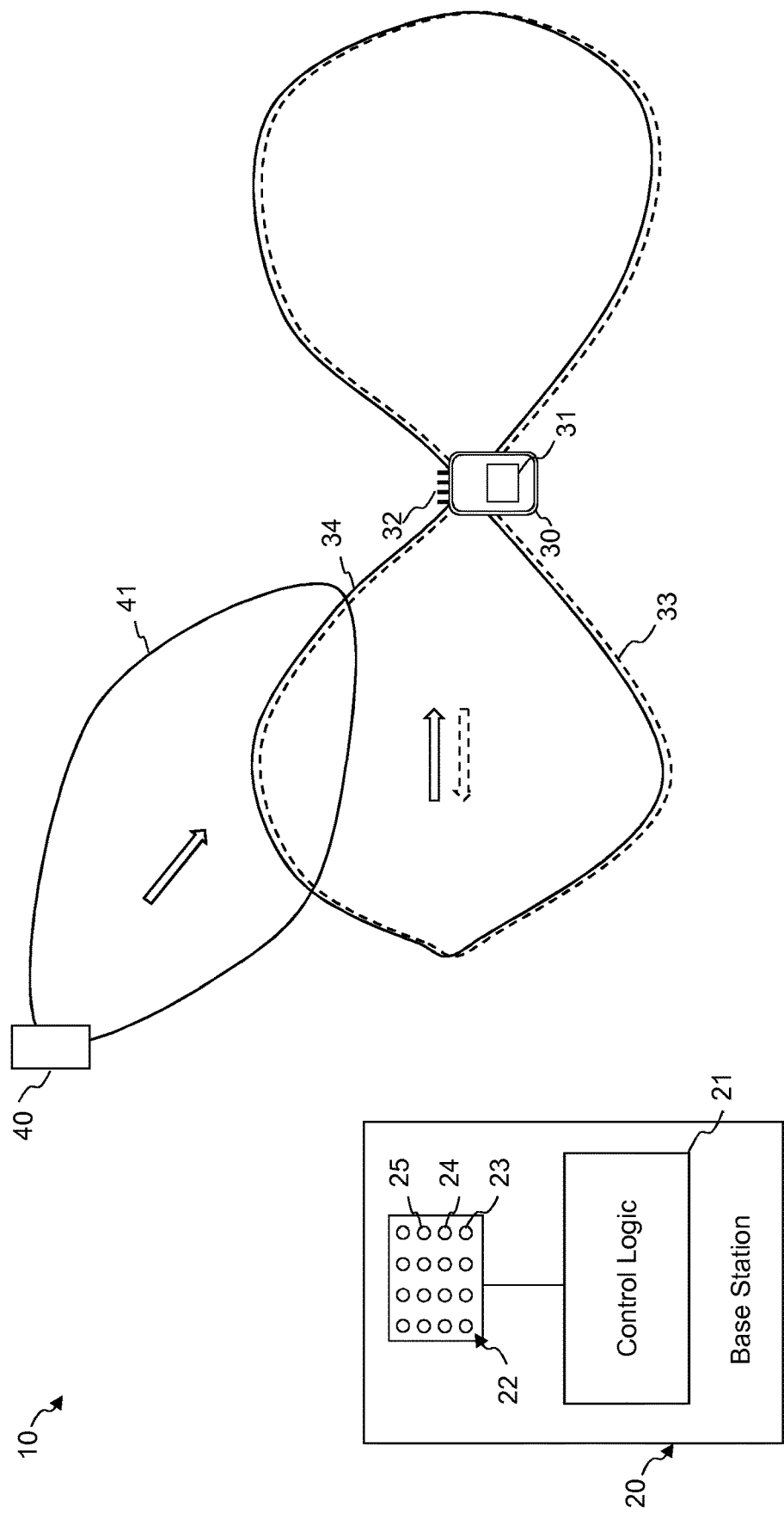
FIGS. 1 and 2 show schematically a MIMO system comprising a base station and a terminal device according to embodiments of the present invention.

FIG. 1 shows schematically a wireless multiple-input and multiple-output (MIMO) system 10 comprising a base station 20 and a terminal device 30. The MIMO system may comprise a plurality of further terminal devices, which are served by the base station 20 but not shown in the figure for clarity reasons. The base station 20 comprises an antenna array 22 including a plurality of antenna elements, of which three are indicated by reference signs 23 to 25. The base station 20 may have a large number of antenna elements 23 to 25, such as several tens or in excess of one hundred or one thousand antenna elements. The antenna elements 23 to 25 may be arranged in a two- or three-dimensional spatial array on a carrier. The base station 20 also comprises associated transceivers for the antenna elements 23 to 25. The plurality of antenna elements may also be spatially distributed to various locations, for example in cooperative MIMO. It is also possible that several base stations interact in cooperative MIMO, with the plurality of antenna elements being distributed over various locations.

The base station 20 is configured to analyze a pilot signal received from the terminal device 30 at the plurality of antenna elements 23 to 25 to determine channel characteristics for a radio signal transmission between the plurality of antenna elements 23 to 25 and the terminal device 30. For illustration, a control logic 21 of the base station 20 may be configured to determine a footprint matrix based on a pilot signal received by the plurality of antenna elements 23 to 25 from a terminal device. The logic 21 may use the footprint matrix to control the plurality of antenna elements 23 to 25 when transmitting radio signals to the terminal device. The logic 21 may compute a Hermitian conjugate of the footprint matrix to determine time delays and amplitudes of radio signals transmitted by each of the plurality of antenna elements 23 to 25 to focus radio energy in a sector in which the terminal device is located. The control may be performed in such a way that focusing of radio energy is not only performed as a function of the direction, but also as a function of distance from the base station 20. A radio signal transmitted by the plurality of antenna elements 23 to 25 in the above-described manner with individually assigned delays and amplitudes to each antenna element is called a "beamformed radio signal" or "precoded radio signal". The set of parameters for assigning delays and amplitudes to each antenna element is called "transmit beamforming parameter". This precoding or transmit beamforming enables the base station 20 to communicate with multiple terminal devices simultaneously using the same time and frequency resources, as the multiple terminal devices are addressed by a spatial multiplexing.

In the receive direction, the logic 21 may assign corresponding delays and gains or weightings to each antenna element 23-25 for adjusting a sensitivity of the antenna array 22 with respect to radio signals transmitted from the terminal device 30. The set of parameters for assigning delays and gains to each antenna element is called "receive beamforming parameter". The receive beamforming enables the base station 20 to communicate with a plurality of terminal devices simultaneously using the same time and frequency resources, as the radio signals from the plurality of terminal devices may be distinguished by spatial multiplexing. For example, the time and frequency resources may be defined in a frame of the MIMO system, for example a resource block defined in a frequency division duplexing (FDD) LTE frame or in a time division duplexing (TDD) LTE frame in a cell of an LTE system.

The terminal device 30 shown in FIG. 1 also comprises a plurality of antenna elements. As an example, the terminal device 30 may comprise four antenna elements, which are indicated by reference sign 32. As described above in connection with the base station 20, the terminal device 30 may comprise transceivers and a control logic 31 to provide a precoding or beamforming when transmitting and/or receiving radio signals by the plurality of antenna elements 32. The beamforming may assign to each antenna element 32 a corresponding individual delay (phase) and amplitude (gain). The set of parameters for assigning delays and amplitudes to each antenna element when sending radio signals is called "transmit beamforming parameter". The set of parameters for assigning delays and gains to each antenna element when receiving radio signals is called "receive beamforming parameter".

FIG. 1 shows an antenna transmit pattern 33 (indicated by the dashed line) generated by a radio signal transmitted from the plurality of antenna elements 32 using a transmit beamforming parameter for focusing the radio signal to the antenna array 22 of the base station 20. Additionally, FIG. 1 shows an antenna receive pattern 34 (indicated by the solid line), which indicates the reception sensitivity of the plurality of antenna elements 32 when receiving a radio signal using the receive beamforming parameter, which focuses the reception sensitivity to the antenna array 22 of the base station 20. The transmit beamforming parameter may be generated based on reciprocity of the receive beamforming parameter, which is generated based for example on a channel sounding of the radio channel between the base station 20 and the terminal device 30 with the pilot signals.

Furthermore, FIG. 1 shows a device 40 which generates an interfering radio signal. Device 40 may comprise for example another terminal device of the MIMO system or of another wireless communication system, or the device 40 may comprise a base station or an access point of the MIMO system or another wireless communication system. The interfering radio signal may have a transmit pattern 41 as indicated by the solid line in FIG. 1. As can be seen from FIG. 1, the transmit pattern 41 of the interfering radio signal is overlapping with the antenna receive pattern 34 of the terminal device 30. Therefore, a radio signal transmitted from the base station 20 and received by the terminal device 30 is disturbed by the interfering radio signal of device 40. Due to the directivity of the interfering radio signal, only the downlink direction from the base station 20 to the terminal device 30 is influenced by the interfering radio signal, whereas the uplink direction from the terminal device 30 to the base station 20 is not influenced by the interfering radio signal. Therefore, in such a situation, a transmit beamforming parameter resulting in the same or similar transmit pattern as the receive pattern resulting from a reciprocal receive beamforming parameter does not provide an optimum transmission in both directions, uplink and downlink.

Figure 2:
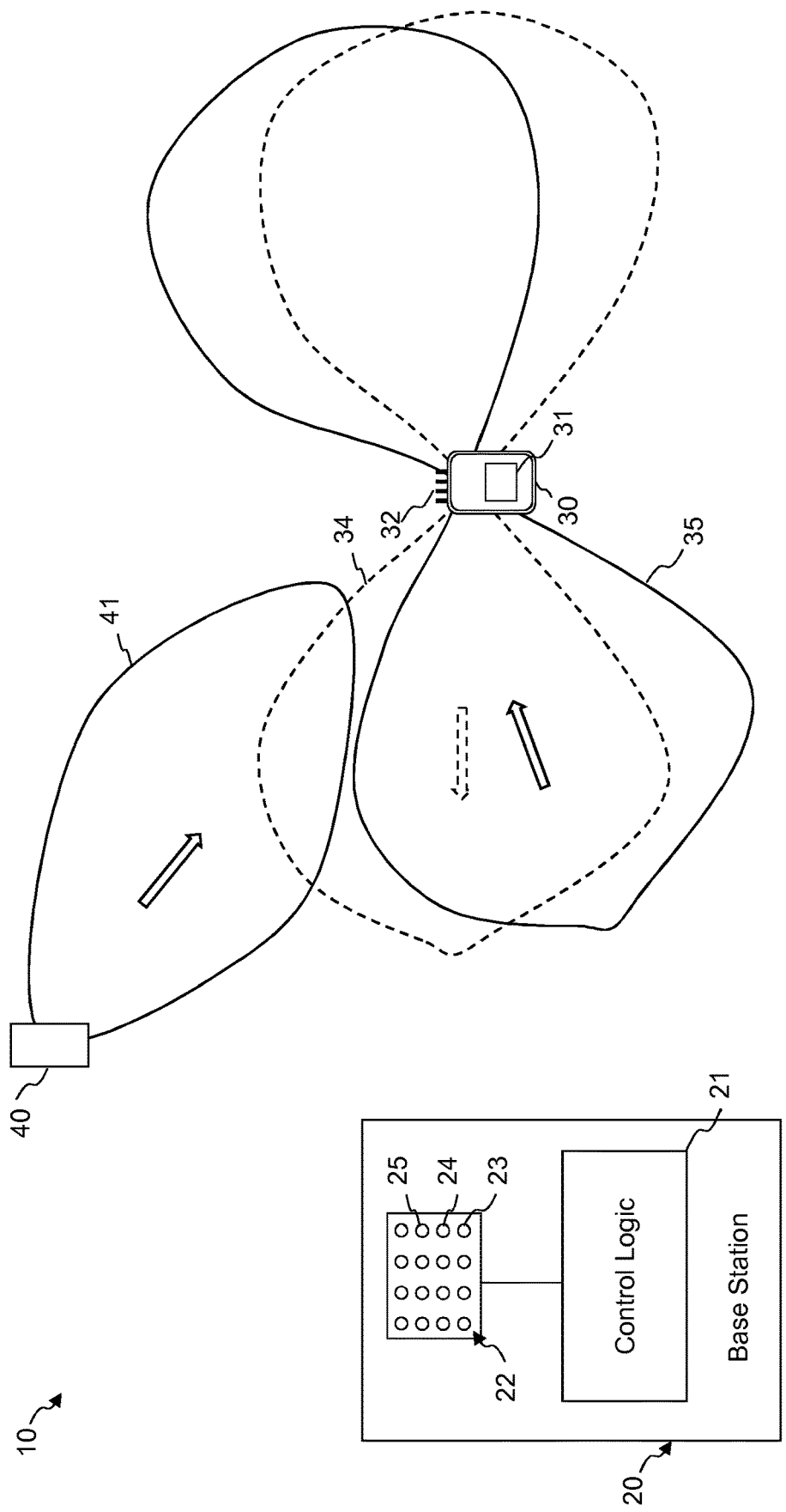

FIG. 2 shows a same arrangement of the devices 20, 30 and 40 as FIG. 1. However, in FIG. 2, the terminal device 30 has another receive pattern 35, which considers the interfering radio signal from the device 40. In particular, the receive pattern 35 is tilted such that the antenna elements 32 of the terminal device 30 are less or non-sensitive to the interfering signals from the device 40. Meanwhile, the transmit pattern 33 is the same as the transmit pattern 33 shown in FIG. 1. Therefore, uplink transmissions from the terminal device 30 to the base station 20 benefit from an optimum adaption to the actual channel characteristics, whereas the downlink transmissions may not be received with an optimum concerning channel characteristics, but essentially exclude deterioration from the interfering radio signal. Additionally, the base station 20 may adapt its downlink beamforming such that the tilted receive pattern 35 of the terminal device 30 is considered to increase signal strength and signal-to-noise ratio.

Figure 3:
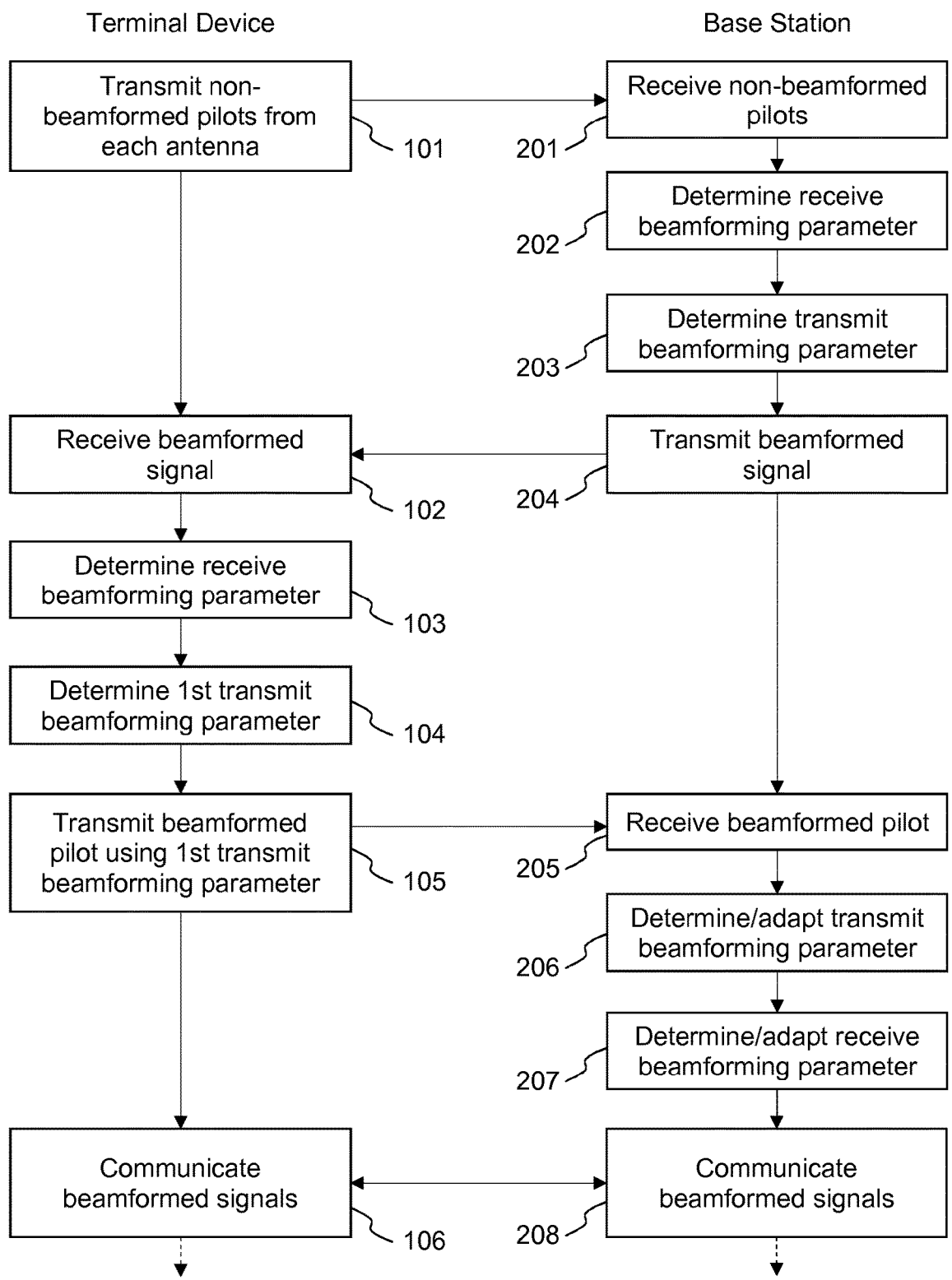
FIGS. 3 and 4 show schematically flowcharts of methods performed by the base station and the terminal device according to embodiments of the present invention.
Figure 4:
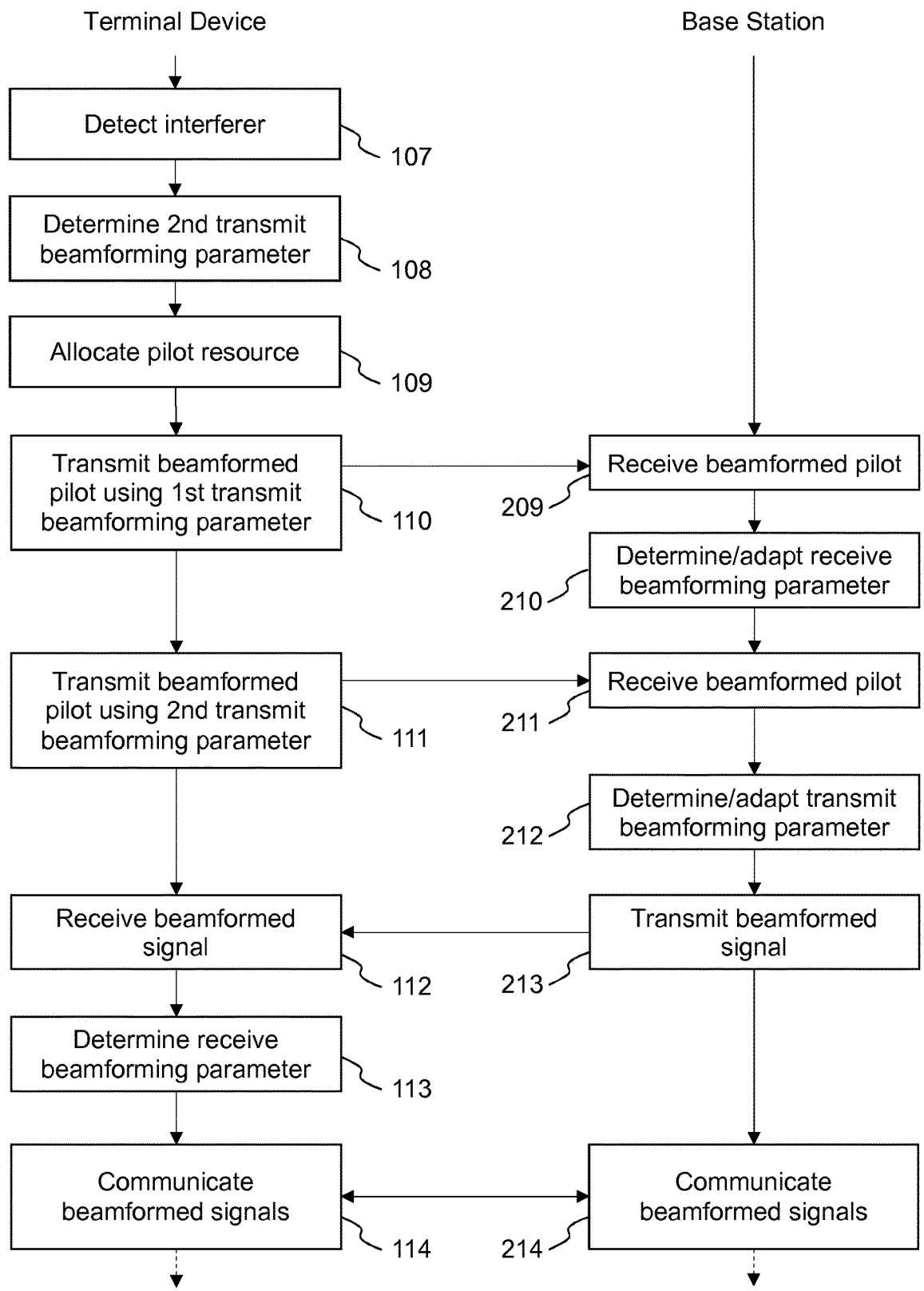

For accomplishing the above-described receive and transmit pattern adaption considering the interfering radio signal, the terminal device 30 may perform the method steps 101 to 114 and the base station 20 may perform the method steps 201 to 214 shown in FIGS. 3 and 4.

The method steps of FIGS. 3 and 4 may be summarised as follows. In steps 101 to 106 and 201 to 208, an initial determination of beamforming parameters for transmitting uplink and downlink signals without considering the interfering radio signal of device 40 is described. In steps 107 to 114 and 209 to 214 the determination and adaption of the beamforming parameters considering the interfering radio signal of device 40 is described such that the pattern state shown in FIG. 2 is reached.

The initial determination of the beamforming parameters starts with transmitting subsequently from each individual antenna element 32 of the plurality of antenna elements of the terminal device 30 an uplink pilot signal, using for example a radio resource of the wireless communication system. In detail, in step 101 a pilot signal is transmitted on only a first antenna element of the plurality of antenna elements of the terminal device 30, while the other antenna elements of the terminal device 30 are silent. Next, the pilot signal is transmitted via only a second antenna element of the plurality of antenna elements of the terminal device 30, while the other antenna elements of the terminal device 30 are silent. This is repeated for each antenna element of the plurality of antenna elements of the terminal device 30. In the example of the terminal device 30 shown in FIGS. 1 and 2, this may be repeated four times for each of the four antenna elements 32 of the terminal device 30. The pilot signals transmitted individually from the single antenna elements (i.e. without beamforming or precoding) are also called "raw" pilot signals. As an alternative, the raw pilot signals may be transmitted in a frequency multiplexed manner from the plurality of antenna elements, wherein different frequencies of frequency ranges are used by the antenna elements for transmitting their corresponding pilot signals.

In the base station 20, the raw uplink pilot signals transmitted subsequently in step 101 from each individual antenna element of the plurality of antenna elements of the terminal device 30 are received in step 201. Thus, a detailed channel sounding of the radio channel between the terminal device 30 and the base station 20 may be performed.

In step 202 the base station 20 determines a receive beamforming parameter based on the channel sounding of the received raw uplink pilot signals. For example, the base station 20 may estimate a Channel State Information (CSI) of the radio channel between the terminal device 30 and the base station 20. Based on the Channel State Information, the base station 20 may compute the receive beamforming parameter that ensures that a radio signal received from the terminal device 30 at the plurality of antenna elements 23 to 25 is coherently combined. The receive beamforming parameter may comprise a definition of a phase and gain or weighting for each antenna element 23-25 of the antenna array 22 of the base station 20. The phase and gain or weighting are used when receiving a radio signal, for example a radio payload signal or a radio pilot signal, via the corresponding antenna elements 23-25 from the terminal device 30. Furthermore, the base station 20 determines in step 203 a transmit beamforming parameter, for example based on the channel sounding of the received raw uplink pilot signals. The transmit beamforming parameter may comprise a definition of a phase and gain or amplitude for each antenna element 23-25 of the antenna array 22 of the base station 20. The phase and gain or amplitude are used when transmitting a radio signal, for example a radio payload signal or a radio pilot signal, via the corresponding antenna elements 23-25 to the terminal device 30. By using the transmit beamforming parameter, the transmitted radio signal may arrive at the antenna elements 32 of the terminal device 30 coherently. It is assumed that the radio channel is reciprocal so that the Channel State Information is valid for both, uplink and downlink communication. Uplink and downlink may use the strongest eigenmode.

In step 204 the base station 20 may transmit a beamformed radio signal using the transmit beamforming parameter to the terminal device 30. The beamformed radio signal may comprise for example a payload radio signal, a control data radio signal or a pilot radio signal.

In step 102 the terminal device 30 receives the beamformed radio signal from the base station 20 and determines in step 103 a receive beamforming parameter based on this beamformed radio signal. The receive beamforming parameter may be determined such that the beamformed radio signal received at the plurality of antenna elements 32 of the terminal device 30 may be combined coherently. The receive beamforming parameter may comprise a definition of a phase and again or weighting for each antenna element 32 of the terminal device 30. The phase and gain or weighting are used when receiving a radio signal from the base station 20, for example a radio payload signal or a radio pilot signal, via the corresponding antenna elements 32. In step 104 the terminal device 30 determines a first transmits beamforming parameter, for example based on reciprocity of the receive beamforming parameter. In the claims, the first transmit beamforming parameter is called "further transmit beamforming parameter".

In step 105 the terminal device may transmit a beamformed pilot signal using the first transmits beamforming parameter to the base station 30. In step 205 the base station 20 receives the beamformed pilot signal using the receive beamforming parameter determined in step 203. The beamformed pilot signal may be transmitted in predefined time-frequency radio resource. The time-frequency radio resource may be defined within a transmission frame defined in the wireless communication system. By transmitting a beamformed pilot signal, a spatial multiplexing is achieved which allows to reuse the time-frequency radio resource simultaneously by other terminal devices.

In step 206 and 207 the transmit beamforming parameter and the receive beamforming parameter used by the base station 20 may be re-determined or adapted based on the received beamformed pilot signal.

In steps 106 and 208 beamformed radio signals comprising for example payload and/or control data may be communicated between the terminal device 30 and the base station 20 according to MIMO technologies using at the terminal device 30 the corresponding first transmit beamforming parameter and the receive beamforming parameter, and at the base station 20 the corresponding transmit beamforming parameter and the receive beamforming parameter.

The radio channel between the terminal device 30 and the base station 20 may vary over time, for example due to environmental changes or when the terminal device is moving. Due to these variations of the radio channel, the transmit and receive beamforming parameters may be adapted continuously. For example, the adaption based on the transmission of beamformed signals as described above in steps 102 to 105 and 204 to 207 may be performed regularly in intervals in the range of for example 1 ms to 100 ms. An adaption or re-determination of the transmit and receive beamforming parameters in the base station 20 as described above in steps 101 and 201 to 203 based on the raw pilot signals may be performed regularly in larger intervals, for example every second or for example once after 10 to 1000 adaptions performed in steps 102 to 105 and 204 to 207.

The above described method steps assume a condition where reciprocity is present in the uplink and downlink communication between the base station 20 and the terminal device 30. However, as described above in connection with FIG. 2, this reciprocity may be violated in case of an interfering radio signal, which essentially influences only one direction. In the following description, it is assumed that the interfering radio signal essentially influences only the downlink direction, i.e. a transmission from the base station 20 to the terminal device 30. However, in another example the interfering radio signal may essentially only interfere the uplink direction, i.e. a transmission from the terminal device 30 to the base station 20 and the principals described below may be adapted easily to such an example.

In step 107 the terminal device 30 determines the presence of an interfering radio signal from the interferer 40. Based on the detected interfering radio signal, the terminal device 30 determines in step 108 a second transmit beamforming parameter which considers the presence of the interfering radio signal. In the claims, the second transmit beamforming parameter is called "transmit beamforming parameter".

For example, the terminal device 30 may identify the properties of the interfering radio signal and may compute a receive beamforming parameter for the antenna elements 32 to significantly nullify the reception of the interfering radio signal. For example, the terminal device 30 may try different phase and amplitude or gain combinations in an iterative manner until the receive beamforming parameter with a null in the direction of the interferer 40 is found. This process may be done in parallel with regular payload and/or control communication and does not need any additional systems support. Additionally or as an alternative, assuming that the terminal device 30 can identify communication frames from the interfering signal, the terminal device 30 may use sounding signals, for example pilot signals from the interferer 40, to instantly derive the receive beamforming parameter, for example based on the dominant eigenmode.

In step 109 the terminal device 30 may allocate a further time-frequency radio resource for transmitting beamformed pilot signal to the base station 20. For example, the terminal device 30 may use a predefined or pre-allocated time-frequency radio resource, or the terminal device 30 may request a time-frequency radio resource from the base station 20. However, the thus allocated further time-frequency radio resource is different from the time-frequency radio resource used for the transmission of the beamformed pilot signal using the first transmits beamforming parameter in step 105.

In step 110 a first beamformed pilot signal is transmitted from the terminal device 30 to the base station 20 using the first transmit beamforming parameter, like in step 105 described above. The first beamformed pilot signal may be transmitted in the same time-frequency resource as the beamformed pilot signal transmitted in step 105. In step 209 the base station receives the first beamformed pilot signal using the corresponding receive beamforming parameter, and the base station determines or adapts its receive beamforming parameter based on the received first beamformed pilot signal.

In step 111 the terminal device 30 transmits a second beamformed pilot signal using the second transmit beamforming parameter and using the further time-frequency radio resource. For example, the first and second beamformed pilot signals may be transmitted within a same frame of the wireless communication system, but in different time-frequency radio resources of the frame. In step 211 the base station 20 receives the second beamformed pilot signal and determines or adapts in step 212 its transmit beamforming parameter based on the received second beamformed pilot signal.

To sum up, in the base station 20, the receive beamforming parameter is adapted based on the first beamformed pilot signal and therefore optimised to the transmit pattern 33 shown in FIG. 2, whereas the transmit beamforming parameter is adapted based on the second beamformed pilot signal and therefore optimised to the receive pattern 35 are shown in FIG. 2.

In step 213 the base station may transmit a beamformed radio signal, for example a payload radio signal or a control data radio signal, using the adapted transmit beamforming parameter to the terminal device 30. The terminal device 30 receives the beamformed radio signal in step 112 and may adapt in step 113 its receive beamforming parameter based on the received beamformed the radio signal, however considering the interfering radio signal from the interferer 40.

In steps 114 and 214 beamformed radio signals comprising for example payload and/or control data may be communicated between the terminal device 30 and the base station 20 according to MIMO technologies using the corresponding first transmit beamforming parameter and receive beamforming parameter at the terminal device 30, and the corresponding transmit beamforming parameter and receive beamforming parameter at the base station 20.

The result is that the beamformed pilots use the strongest channel for the uplink transmissions and the channel with the highest Signal to Interference and Noise Ratio (SINR) for the downlink communication. Likewise, subsequent data communication between the base station 20 and the terminal device 30 may use the strongest channel for the uplink transmissions and the channel with the highest SINR for the downlink transmissions.

As described above, the radio channel between the terminal device 30 and the base station 20 may vary over time, and due to these variations, the (first and second) transmit and receive beamforming parameters may be adapted continuously. For example, the adaption based on the transmission of beamformed signals as described above in steps 108 to 113 and 209 to 213 may be performed regularly in intervals in the range of for example 1 ms to 100 ms as long as the interfering signal is detected by the terminal device 30. An adaption or re-determination of the transmit and receive beamforming parameters in the base station 20 as described above in steps 101 and 201 to 203 may be performed regularly in larger intervals, for example every second or for example once after 10 to 1000 adaptions performed in steps 108 to 113 and 209 to 213.

The step 107 of detecting the interfering signal may also be performed in regular intervals, for example every few milliseconds, and in case the terminal device 30 detects that the interfering signal is not present any more, transmission of the second pilot signal using the second transmit beamforming parameter may be omitted, and the adaption or re-determination of the transmit and receive beamforming parameters may be performed in the base station 20 and the terminal device 30 as described above in connection with steps 102 to 105 and 204 to 207 only.

The invention claimed is:
1. A method for operating a device of a wireless multiple-input and multiple-output (MIMO) system providing a wireless communication, the method comprising:
  detecting a beamformed signal from a further device of the wireless MIMO system;

determining a first transmit beamforming parameter based on the detected beamformed signal from the further device;

detecting an interfering signal interfering the wireless communication;

determining a second transmit beamforming parameter based on the detected interfering signal; wherein the first transmit beamforming parameter is at least partially different from the second transmit beamforming parameter;

transmitting a beamformed pilot signal on a first time-frequency radio resource using the second transmit beamforming parameter; and transmitting a further beamformed pilot signal on a second time-frequency radio resource using the first transmit beamforming parameter, the first time-frequency radio resource being different from the second time-frequency radio resource, wherein the beamformed pilot signal and the further beamformed pilot signal are transmitted in a same communication frame defined in the MIMO system.

2. The method according to claim 1, further comprising:
transmitting a time-frequency radio resource allocation request requesting an allocation of a time-frequency radio resource for transmitting the beamformed pilot signal, receiving a confirmation in response to the time-frequency radio resource allocation request, the confirmation comprising the first time-frequency radio resource for transmitting the beamformed pilot signal, and transmitting the beamformed pilot signal on the first time-frequency radio resource.

3. The method according to claim 1, further comprising:
determining the first time-frequency radio resource for transmitting the beam-formed pilot signal, transmitting a notification indicating the determined first time-frequency radio resource, receiving a confirmation in response to the notification, the confirmation indicating an acknowledgement to use the first time-frequency radio resource for transmitting the beamformed pilot signal, and transmitting the beamformed pilot signal on the first time-frequency radio resource.

4. The method according to claim 1, further comprising:
determining a receive beamforming parameter based on the detected beamformed signal from the further device.

5. The method according to claim 1, further comprising:
determining the second transmit beamforming parameter additionally based on the first transmit beamforming parameter.

6. The method according to claim 1, further comprising:
transmitting beamformed payload signals using the first transmit beamforming parameter.

7. The method according to claim 1, further comprising:
transmitting, from each individual antenna element of a plurality of antenna elements of the device, a corresponding raw pilot signal on a dedicated time-frequency radio resource.

8. A method for operating a device of a wireless multiple-input and multiple-output (MIMO) system providing a wireless communication, the method comprising:
detecting a beamformed pilot signal on a first time-frequency radio resource, the beamformed pilot signal being transmitted from a further device of the MIMO system using a second transmit beamforming parameter, the second transmit beamforming parameter being determined based on a detected interfering signal interfering the wireless communication;

detecting a further beamformed pilot signal from the further device on a second time-frequency radio resource, the first and second time-frequency radio resources being different; wherein the beamformed pilot signal and the further beamformed pilot signal are transmitted from the further device in a same communication frame defined in the MIMO system;

determining a receive beamforming parameter based on the detected further beamformed pilot signal from the further device, the further beamformed pilot signal being associated with a first transmit beamforming parameter different to the second transmit beamforming parameter associated with the beamformed pilot signal; and determining a transmit beamforming parameter based on the detected beamformed pilot signal from the further device.

9. The method according to claim 8, further comprising:
receiving a time-frequency radio resource allocation request from the further device, the time-frequency radio resource allocation request requesting an allocation of a time-frequency radio resource for transmitting the beamformed pilot signal, determining the first time-frequency radio resource for transmitting the beam-formed pilot signal, and transmitting a confirmation comprising the determined first time-frequency radio resource to the further device.

10. The method according to claim 8, further comprising:
receiving a notification indicating the first time-frequency radio resource for transmitting the beamformed pilot signal from the further device, and transmitting a confirmation in response to the notification, the confirmation indicating an acknowledgement to use the first time-frequency radio resource for transmitting the beamformed pilot signal from the further device.

11. The method according to claim 8, further comprising:
receiving from at least one individual antenna element of a plurality of antenna elements of the further device a corresponding raw pilot signal on a dedicated time-frequency radio resource;

determining an initial transmit beamforming parameter based on the at least one received raw pilot signal; and determining an initial receive beamforming parameter based on the at least one received raw pilot signal.

12. The method according to claim 8, further comprising:
transmitting a beamformed signal using the determined transmit beamforming parameter.

13. The method according to claim 8, further comprising:
determining, whether the beamformed pilot signal is received, and in case the beamformed pilot signal is not received, determining the transmit beamforming parameter based on the further beamformed pilot signal, and in case the beamformed pilot signal is received, determining the transmit beamforming parameter based on the beamformed pilot signal.

14. The method according to claim 8, further comprising:
receiving a beamformed payload signal from the further device using the determined receive beamforming parameter.

15. A device of a wireless multiple-input and multiple-output (MIMO) system providing a wireless communication, the device comprising:
a plurality of antenna elements, and
a logic configured to:

detect a beamformed signal from a further device of the wireless MIMO system;

determine a first transmit beamforming parameter based on the detected beamformed signal from the further device;

detect an interfering signal received at the plurality of antenna elements, the interfering signal interfering the wireless communication;

determine a second transmit beamforming parameter based on the detected interfering signal; wherein the first transmit beamforming parameter is at least partially different from the second transmit beamforming parameter;

transmit a beamformed pilot signal on a first time-frequency radio resource using the second transmit beamforming parameter via the plurality of antenna elements, and transmit a further beamformed pilot signal on a second time-frequency radio resource using the first transmit beamforming parameter, the first time-frequency radio resource being different from the second time-frequency radio resource, wherein the beamformed pilot signal and the further beamformed pilot signal are transmitted in a same communication frame defined in the MIMO system.

16. A device of a wireless multiple-input and multiple-output (MIMO) system providing a wireless communication, the device comprising:

a plurality of antenna elements, and a logic configured to:

detect a beamformed pilot signal on a first time-frequency radio resource, the beamformed pilot signal being transmitted from a further device of the MIMO system using a second transmit beamforming parameter, the second transmit beamforming parameter being determined based on a detected interfering signal interfering the wireless communication;

detect a further beamformed pilot signal from the further device on a second time-frequency radio resource, the first and second time-frequency radio resources being different; wherein the beamformed pilot signal and the further beamformed pilot signal are transmitted from the further device in a same communication frame defined in the MIMO system;

determine a receive beamforming parameter based on the detected further beamformed pilot signal from the further device, the further beamformed pilot signal being associated with a first transmit beamforming parameter different to the second transmit beamforming parameter associated with the beamformed pilot signal; and determine a transmit beamforming parameter based on the detected beamformed pilot signal from the further device.

\* \* \* \* \*